US007849081B1

(12) United States Patent
Chang et al.

(10) Patent No.: US 7,849,081 B1
(45) Date of Patent: Dec. 7, 2010

(54) DOCUMENT ANALYZER AND METADATA GENERATION AND USE

(75) Inventors: Walter Chang, San Jose, CA (US); Michael J. Welch, Los Angeles, CA (US)

(73) Assignee: Adobe Systems Incorporated, San Jose, CA (US)

( * ) Notice: Subject to any disclaimer, the term of this patent is extended or adjusted under 35 U.S.C. 154(b) by 560 days.

(21) Appl. No.: 11/946,671

(22) Filed: Nov. 28, 2007

(51) Int. Cl.
*G06F 17/30* (2006.01)

(52) U.S. Cl. .................. 707/727; 707/794; 715/256
(58) Field of Classification Search ............... 707/727, 707/794; 715/256
See application file for complete search history.

(56) References Cited

U.S. PATENT DOCUMENTS

| | | | |
|---|---|---|---|
| 5,850,520 A | 12/1998 | Griebenow et al. | |
| 5,937,392 A | 8/1999 | Alberts | |
| 5,948,061 A | 9/1999 | Merriman et al. | |
| 6,009,410 A | 12/1999 | LeMole et al. | |
| 6,014,502 A | 1/2000 | Moraes | |
| 6,134,532 A | 10/2000 | Lazarus et al. | |
| 6,154,737 A * | 11/2000 | Inaba et al. ............ | 707/696 |
| 6,173,045 B1 | 1/2001 | Smith | |
| 6,243,104 B1 | 6/2001 | Murray | |
| 6,297,824 B1 | 10/2001 | Hearst et al. | |
| 6,314,451 B1 | 11/2001 | Landsman et al. | |
| 2002/0188532 A1 | 12/2002 | Rothstein | |
| 2007/0174267 A1* | 7/2007 | Patterson et al. ............ | 707/5 |
| 2008/0147638 A1* | 6/2008 | Hoeber et al. ............ | 707/5 |

OTHER PUBLICATIONS

Swaine, Michael "Shhh! Online Libraries", Net Traveler, v 11, n12, p. 155, Dec. 1995.
E-Book Systems, Inc., Flipbrowser—3D page-flipping web brow . . . bmaster, internet, free download trial, www.flipbrowser.com/home. php, p. 1-3, copyright 1998-2001, E-Book Systems, Inc., Santa Clara, CA.
Bell Atlantic Launches Interactive Yellow Pages on Web (Bell Atlantic Interactive launched Yellow Pages directory on World Wide Web; Internet Guide to be in traditional Yellow Pages directories), Newsbytes News Network, p N/A, p. 1-2, Feb. 12, 1997, Journal (United States).

\* cited by examiner

*Primary Examiner*—Cheryl Lewis

(57) ABSTRACT

A document analyzer receives a collection of text-based terms associated with a document. The document analyzer performs a statistical analysis on the text-based terms to identify a distribution of where the text-based terms appear in the document and relative frequency indicating how often the text-based terms appear in the document. The document analyzer utilizes the distribution and relative frequency information derived from the statistical analysis to rank multiple themes associated with the document. For example, a received listing of multiple themes may not be presented in any useful order, although it can be assumed that the themes in the listing are present in the document. Based on application of distribution and relative frequency information derived from the analysis, the document analyzer can identify which themes are most relevant to the document as a whole and/or which of themes correspond to different portions (e.g., pages or sections) of the document.

26 Claims, 14 Drawing Sheets

FIG. 5

FIRST SET OF THEMES

| | | THEME 410-5 / THEME 410-7 |
|---|---|---|
| [01] | 17.0 | government and military \| government \| municipal government \| urban areas \| cities |
| [02] | 17.0 | enjoyment |
| [03] | 17.0 | culture and society \| leisure and recreation \| arts and entertainment \| visual arts \| art galleries and museums \| museums |
| [04] | 17.0 | technology and sciences \| social sciences \| history |
| [05] | 17.0 | transportation \| parking |
| [06] | 17.0 | largeness |
| [07] | 16.0 | groups \| inclusion |
| [08] | 15.0 | offers |
| [09] | 15.0 | transportation \| travel industry \| tourism |
| [10] | 15.0 | geography \| physical geography \| bodies of water \| rivers |
| [11] | 15.0 | shopping |
| [12] | 14.0 | reputation |
| [13] | 14.0 | geography \| political geography \| North America \| Canada \| Quebec |
| [14] | 13.0 | geography \| political geography \| North America \| Canada \| Toronto |
| [15] | 13.0 | geography \| physical geography \| land forms \| mountains |
| [16] | 13.0 | relation |
| [17] | 13.0 | geography \| political geography \| North America \| Canada \| Saskatchewan |
| [18] | 4.0 | groups |
| [20] | 1.0 | transportation |
| [21] | 1.0 | geography \| political geography \| North America \| Canada |
| [22] | 17.0 | concepts \| quantifying relations \| existence \| creation \| construction |
| [23] | 13.0 | concepts \| dynamic relations \| activity |
| [24] | 4.0 | concepts \| quantifying relations \| quality |
| [25] | 4.0 | concepts \| quantifying relations \| range \| areas |

RANK COLUMN

| TOP RANKED TERMS 125 | | SECOND SET OF THEMES 182 |
|---|---|---|
| RANKING | TERM | RE-RANKING |
| 1 | City | [01] |
| 2 | CANADA | [21] |
| 3 | Museum | [03] |
| 4 | offer | [08] |
| 5 | Park | [05] |
| 6 | Area | [24] |
| 7 | Shop | [11] |
| 8 | History | [04] |
| 9 | Toronto | [14] |
| 10 | SASKATCHEWAN | [17] |

NUMBER IN BRACKET INDICATES CORRESPONDING THEME IN RANK COLUMN OF FIG. 5

Permutations — 183

| | Permutations |
|---|---|
| 1 | City CANADA |
| 2 | City Museum |
| 3 | City offer |
| 4 | CANADA Museum |
| 5 | CANADA offer |
| 6 | Museum offer |

FIG. 6

General Summary

You can experience much of the city's heritage in the historic downtown core with its winding streets, where there are museums, galleries, parks, restaurants, shops and small hotels in abundance. These include the Museum of Fine Arts (Canada's oldest museum), the McCord Museum of Canadian History, the Canadian Center for Architecture and the Musee d'art contemporain for modern art. The Laurentian Mountains Directly north of Montreal, the Laurentians is an enchanting mountainous region where you will find North America's largest I National Parks in Quebec Provincial Parks in Quebec A a QUEBEC VIRTUAL CANADA I 98 I The Laurentians Mont Tremblant Resort, bicycle, cross-country ski and snowmobile paths, renovated railroad stations, ski centers (16), 2 provincial parks. Historic Landmarks and Museums Toronto's historic Fort York has the largest collection of original _W_a_r_o_f__1_8_1_2_ buildings in Canada. 8 Wild Water Kingdom Canada's largest

184

Category Combinations – next best

| 1 | cities Canada | 9 | Canada offers | 17 | museums areas | 25 | parking shopping |
|---|---|---|---|---|---|---|---|
| 2 | cities museums | 10 | Canada parking | 18 | museums shopping | 26 | inclusion areas |
| 3 | cities offers | 11 | Canada inclusion | 19 | offers parking | 27 | inclusion shopping |
| 4 | cities parking | 12 | Canada areas | 20 | offers inclusion | 28 | areas shopping |
| 5 | cities inclusion | 13 | Canada shopping | 21 | offers areas | | |
| 6 | cities areas | 14 | museums offers | 22 | offers shopping | | |
| 7 | cities shopping | 15 | museums parking | 23 | parking inclusion | | |
| 8 | Canada museums | 16 | museums inclusion | 24 | parking areas | | |

DOCUMENT ANALYZER AND METADATA GENERATION AND USE

RELATED APPLICATIONS

This application is related to U.S. Patent Application entitled "DOCUMENT ANALYSIS AND MULTI-WORD TERM DETECTOR," application Ser. No. 11/946,637, filed on Nov. 28, 2007, the entire teachings of which are incorporated herein by this reference.

This application is related to United States Patent Application entitled "GENERATION AND PROCESSING OF NUMERICAL IDENTIFIERS," application Ser. No. 11/946,680, filed on Nov. 28, 2007, the entire teachings of which are incorporated herein by this reference.

BACKGROUND

Advertising in a network environment can be done in a number of different ways. For example, advertisements can be displayed on a search engine web page. Advertisements also can be displayed on web sites via means such as an advertisement banner.

According to one conventional method, when a user clicks on an advertisement banner displayed on a web page, the user's browser initiates retrieval of an advertisement web page associated with the banner.

Advertisers typically choose keywords or keyword phrases to be associated with their advertisements. In general, the keywords specify when to distribute an advertisement web page to a viewer.

For example, suppose that an advertiser wishes to advertise a brand of scuba equipment. In such an instance, the advertiser may choose the term "Toronto tourism" as a keyword phrase to be associated with the advertisement. When a viewer requests viewing of a web page, the server identifies the theme of the web page to identify which advertisements to serve to the user. In this example, assume that the retrieved web page is about scuba equipment. In such an instance, the server will identify the appropriate advertisement in a repository having the associated keyword phrase "Toronto tourism" and serve the "Toronto tourism" advertisement to the requestor. Thus, keywords are useful for targeted advertising.

In certain cases, multiple advertisers compete against each other for rights to use of keywords or keyword phrases because they want their advertisements displayed to users that retrieve certain types of web pages.

As mentioned above, when an end user enters a web site including an advertisement, the advertisement (for which the advertisers have bid on keyword or keyword phrases) is displayed to the end user. The displaying of the advertisement banner or selectable advertisement region in a retrieved web page is referred to as an 'impression'.

Advertisers do not always pay for mere impressions. However, when an end user selects (i.e., "clicks") an advertisement web page link by clicking a selectable region to view the corresponding advertisement, the advertiser normally is charged in response to the end user's selection. Typically, upon selection by the viewer to retrieve and view the advertisement, the advertiser is charged whatever amount the advertiser bid on the keyword or keyword phrase that caused the displaying (i.e., impression) of the advertisement.

According to conventional methods, each time an end user clicks on an advertisement in the above example, the advertiser is charged for that selection. This is known as "pay per click" since the advertiser only pays for the advertisement when an end user selects (i.e., "clicks") on a displayed advertisement.

SUMMARY

Conventional techniques for retrieving content can suffer from a number of deficiencies. For example, attempts have been made to accurately tag each of multiple documents with one or more appropriate keywords or themes. The chosen keywords must capture an essence of the corresponding document to be useful. If the keywords or themes to be associated with a document are not chosen properly, as is often the case in conventional methods, advertisements cannot be properly targeted to a consumer.

As an example, suppose that a document is about treating improper dog behavior, but a keyword generator improperly tags the document as being about feeding dogs and not treating improper dog behavior. Upon serving the document to a viewer (who may be retrieving the document via use of a search engine), the server may distribute advertisements about a new dog food product when the document is retrieved by corresponding viewers. A viewer may not be interested in the new type of dog food and thus not click on the advertisement. Instead, the viewer may be more interested in possible remedies to treat bad dog behavior because the user is retrieving the document to learn of different ways of treating bad dog behavior such as barking, attacking, urinating in the house, eating furniture, etc.

In such an instance, as discussed above, when keywords are not accurately selected for the document, distribution of a less appropriate advertisement (i.e., the dog food advertisement instead of information about treating bad dog behavior) to a document requestor has minimal utility. If, instead, the document was properly tagged (with a keyword such as "bad dog behavior") and the server sent an advertisement for a book describing how to treat bad dog behavior, an advertisement would have more likely been selected by the user for further retrieval and viewing. The latter instance may result in the viewer purchasing the book in the advertisement.

Techniques discussed herein deviate with respect to conventional applications. For example, embodiments herein include novel ways to generate essence metadata such as keyword or category information associating with one entire document (such as in the case of a web page, PDF, etc.), or by associating keyword or category information specific to each page of the document. The essence metadata according to embodiments herein can be generated for each of multiple documents and can be used for purposes such as more accurate targeted advertising as will be discussed in more detail below.

More specifically, to generate essence or 'aboutness' metadata associated with a document, a document analyzer receives a collection of text-based terms associated with the document. Note that the document can be in any form such as a web page, unstructured text file, semiconductor-structured text file (e.g., a PDF document), database, e-mail, letter, etc.

The document analyzer initially performs a statistical analysis on the text-based terms in the document to identify a distribution and relative frequency of text-based terms present in the document. Distribution information derived by the statistical analysis can indicate positional or location information such as where the text-based terms appear in the document. The term frequency can indicate information such as how often the different text-based terms appear in the document.

In addition to performing the statistical analysis as discussed above, the document analyzer can receive a listing of multiple themes associated with the document. In one embodiment, the listing of multiple themes can be derived as a result of performing a semantic analysis of the document.

Each of the themes in the received listing can include a corresponding term (e.g., one or more words) found in the document as well as an inference chain of category information derived from an ontological analysis of the corresponding term. For example, in one embodiment, the inference chain specifies pertinent category information in which the term (and therefore the document) should be most likely categorized. Thus, a theme associated with a document can include terms found in the document and/or category information.

To rank the multiple themes in the received listing, the document analyzer utilizes the distribution and relative frequency information derived from the statistical analysis. For example, the listing multiple themes may not be presented in any useful order to the document analyzer, although it can be assumed that the themes in the listing are representative of concepts described in the document. Based on distribution and relative frequency information, the document analyzer can identify which themes (e.g., document terms and inference chains of category information) in the listing of themes are most relevant to the document as a whole and/or which of themes correspond to the different portions (e.g., pages or sections) of the document.

It is possible that the document being analyzed has any number of corresponding themes. Embodiments herein include utilizing the distribution and/or relative term frequency of words and/or phrases of words to more accurately identify one or more themes or keywords for associating with a document. Keywords used to describe an essence of a portion of a document can be different than keywords that describe only a section of the document.

More specifically, based on the distribution and relative term frequency information derived from a statistical analysis, a document analyzer system according to embodiments herein can produce a ranked list of most relevant text-based terms found in the document. The document analyzer applies the ranked list of most relevant text-based terms to the multiple themes to generate a ranking (or re-ranking) of the multiple themes. The generated ranking can include an ordering of themes that most likely represent an essence of the document to themes that are less likely to represent the essence of the document.

As mentioned above, one purpose for producing a ranking (or re-ranking) of themes according to embodiments herein is targeted advertising. For example, the ranked themes can be distributed to one or more remote processes (e.g., a search engine that distributes advertisements along with requested documents) that utilize the ranked themes to identify relevant advertisements for displaying to a user upon retrieval of documents by the user. In other words, when a document such as a web page is retrieved by a user, the corresponding theme information, keywords, etc. generated for the web page according to embodiments herein can be used to identify an appropriate advertisement for displaying along with the web page.

In yet further embodiments, note that the document analyzer can utilize the distribution and term frequency information derived from the statistical analysis to identify themes associated with different sections of a document. For example, the document analyzer can utilize the statistical information to identify a corresponding set of one or more most representative text-based terms for each section (e.g., page) of multiple sections in the document.

Typically, the themes (e.g., one or more themes generated via a semantic analysis of the document) can include terms that appear in the document. As discussed above, the statistical analysis produces location information as discussed above for different terms (e.g., words and/or phrases) in the document. According to one embodiment, the document analyzer matches the top identified terms based on the statistical analysis to terms found in the listing of themes to identify themes most likely to represent the essence of the document being analyzed.

Thus, for the whole document or each of the multiple pages in the document, the document analyzer utilizes the corresponding set of one or more most representative text-based terms for each section to identify one or more themes associated with each respective section of the document.

The above process of producing the distribution information reduces overall processing because a theme generator can produce a complete listing of all themes that may be associated with a document network administrator single pass. The statistical information (e.g., distribution and term frequency information) derived form analyzing where terms are located in the document can be used by the document analyzer to identify most representative terms in a selected section (e.g., page) of the document. The most representative terms associated with the selected section are then used to search and identify the listing of themes to that are associated with the selected section.

Accordingly, embodiments herein can include a document analyzer that produces metadata (e.g., keyword information, category information, etc.) associated with respective sections of a document. As previously discussed, choosing of more accurate keywords or themes of a document enables more accurate targeted advertising.

In one embodiment, the document analyzer system is a hybrid document analyzer system including both a semantic analyzer and a statistical analyzer to automatically select document categories and keywords for associating with a document.

These and other embodiments will be discussed in more detail below.

Note that embodiments herein can include a configuration of one or more computerized devices, websites, hosted services, workstations, handheld or laptop computers, or the like to carry out and/or support any or all of the method operations disclosed herein. In other words, one or more computerized devices or processors can be programmed and/or configured to include a document analyzer and/or related functions as explained herein to carry out different embodiments of the invention.

Yet other embodiments herein include software programs to perform the steps and operations summarized above and disclosed in detail below. One such embodiment comprises a computer program product that has a computer-readable medium (e.g., a tangible computer readable media) including computer program logic encoded thereon that, when performed in a computerized device having a processor and corresponding memory, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes a computer readable medium having instructions stored thereon for supporting operations such as analyzing documents and generating an appropriate ordering of themes. The instructions, and thus method as described herein, when carried out by a processor of a respective computer device, cause the processor to: i) receive a collection of text-based terms associated with a document; ii) perform a statistical analysis on the text-based terms to identify a distribution and relative frequency of the text-based terms in the document; iii) receive a listing of multiple themes associated with the document, the listing of multiple themes being derived as a result of performing a semantic analysis of the document; and iv) utilize the distribution and relative frequency information derived from the statistical analysis to rank the multiple themes. The numbering of the previous steps has been added for clarity sake, these steps need not be performed in any particular order.

Other embodiments of the present disclosure include software programs to perform any of the method embodiment steps and operations summarized above and disclosed in detail below.

Also, it is to be understood that the system, method and apparatus herein can be embodied strictly as a software program, as a hybrid of software and hardware, or as hardware alone such as within a processor, or within an operating system or within a software application. Example embodiments of the invention may be implemented in products and/ or software applications such as those manufactured by Adobe Systems Incorporated of San Jose, Calif., USA.

As discussed above, techniques herein are well suited for use in software applications used to analyze documents to identify pertinent themes/keywords/categories associated with a document. However, it should be noted that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note also that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

FIG. 5 is an example diagram illustrating a set of ranked themes according to embodiments herein.

FIG. 6 is an example diagram illustrating a ranking of terms in a document based on distribution and frequency analysis as well as a re-ranked listing of themes according to embodiments herein.

FIG. 7 is an example diagram illustrating summary information and category combination information according to embodiments herein.

DETAILED DESCRIPTION

Figure 1:
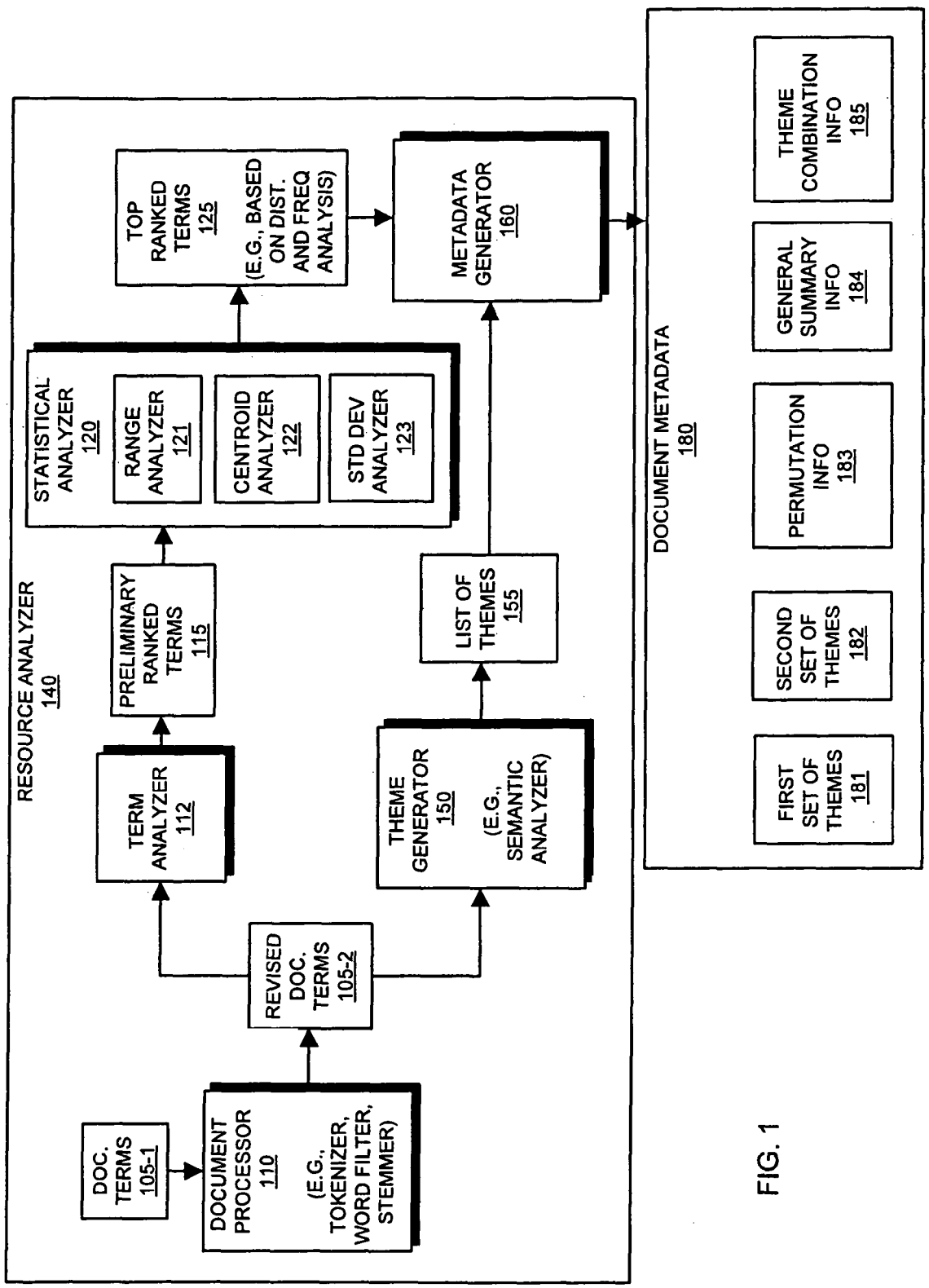
FIG. 1 is an example diagram of a resource analyzer environment according to embodiments herein.

According to an example embodiment as described herein, a resource analyzer such as a document analyzer performs a statistical analysis on text-based terms in a document to identify a distribution and relative frequency of text-based terms in the document. In general, distribution information derived from the statistical analysis provides insight as to where the text-based terms appear in the document. The relative frequency information derived from the statistical analysis provides insight as to how often the text-based terms appear in the document.

The document analyzer utilizes the distribution and relative frequency information derived from the statistical analysis to rank multiple themes associated with the document. For example, a received listing of multiple themes may not be presented in any useful order, although it can be assumed that the themes in the listing are present in the document. Each theme can include a term (e.g., a character string, a token, a phrase of multiple words, a single word, etc.) found in the document.

Based on application of distribution and relative frequency information derived from the analysis of terms in the document, the document analyzer can identify which themes in a listing of multiple themes are most relevant to the document as a whole and/or which of themes in the listing most accurately reflect the corresponding different portions (e.g., pages or sections) of the document.

One purpose for generating the essence metadata (or ranked set of themes) and identifying the top themes, keywords, terms, etc. in a document is targeted advertising. For example, the metadata information generated for a corresponding document can be distributed to one or more remote processes that utilize the ranked themes to identify relevant advertisements for displaying to a user upon retrieval of the document by the user.

In one embodiment, when a user retrieves a document such as a web page, PDF document, etc., the theme information generated for the document according to embodiments herein can be used to identify a more appropriate advertisement for displaying along with the web page. That is, upon receiving a request for the document, a server can review essence metadata information (e.g., keywords, categories, etc.) and identify a set of most relevant themes associated with the document. Based on matching the most relevant themes to a set of corresponding one or more advertisements, the server can select most appropriate advertisements for sending along with the document to a requestor. As previously discussed, the server can identify a page of a document being viewed by a user (because a user may be interested in the specific contents of the page relative to other pages which may have different themes) and target specific advertisements based on a page (and corresponding theme) being viewed by the user rather than serving merely a single advertisement that matches a theme of the whole document, which may not be of interest to a viewer.

FIG. 1 is an example block diagram of an environment 100 for analyzing documents and generating keyword/category information according to embodiments herein. In general, the resource analyzer 140 processes information associated with a document to produce corresponding document metadata 180 (e.g., keyword information, category information specifying category in which the document resides, etc.). As previously discussed, the document metadata 180 generated for each of one or more documents can be used to more accurately target advertisements to consumers.

As shown, resource analyzer 140 includes document processor 110, term analyzer 112, statistical analyzer 120, theme generator 150, and metadata generator 160. Each of these elements provides different processing functionality as will be discussed below.

To produce metadata for a given document 105-1, the document processor 110 selects document 105-1 from a pool of multiple documents. Note that the document can generally be in any form such as a web page, PDF file, text file, database, e-mail, letter, etc.

In the context of the present example, assume that document 105-1 includes words, phrases, punctuation, etc. differentiating it from other documents. Document processor 110 performs processes such as removal of punctuation and stopwords, filtering of words, stemming (e.g., conversion of words to their root form), etc. to produce a set of revised document terms 105-2. In other words, document processor 110 performs initial processing to convert a raw document into a set of base terms. The process as described herein can be performed on each of multiple documents.

In one embodiment, the process or stemming and filtering results in a revised document terms 105-2 including a set of root words found in the document 105-1.

The root words are further analyzed to identify their relative importance and determining whether they represent an essence of the document 105-1.

As its name suggests, term analyzer 112 analyzes the filtered document terms 105-2 (e.g., root words or phrases of root words) and produces a set of preliminary ranked terms (e.g., root words) found in the set of revised document terms 105-2. The set of preliminary ranked terms 115 includes an initial pass as to which root terms in the document 105-1 most likely represent an essence of the document 105-1 as a whole.

For example, in one embodiment, the term analyzer 112 produces preliminary ranked terms 115 by ranking the terms present in document 105-2 in order of importance and/or relevance. One way to determine the most representative and/or relevant terms in a document is to apply a function such as TF-IDF (e.g., Term Frequency—Inverse Document Frequency).

After creation of the set of preliminary ranked terms 112, the statistical analyzer 120 performs a further analysis of terms present in document 105-1 to take into account where the terms appear in the document to identify which terms more accurately represent an essence of the whole document 105-1. One purpose of performing the statistical analysis to re-rank preliminary ranked terms 115 and produce top ranked terms 125 is to take into account that terms appearing most often in the document may not represent the overall essence of the document if the words are located in a single paragraph in the document as opposed to being spread widely throughout the document.

The statistical analyzer 120 includes a range analyzer function 121 to keep track of a first and last occurrence of each of the preliminary ranked terms 115 found in document 105-1. The range parameter helps to quickly identify whether a given term in the document is located in only a narrow portion (e.g., a sentence or a paragraph) of the document or whether the given term is possibly spread widely throughout the document such as on every page of multiple pages.

Statistical analyzer 120 includes centroid analyzer function 122 to compute a weighted average location value indicating an average location in document 105-1 where each corresponding term can be located. The centroid analyzer 122 identifies an average position where a given term can be found in the document. Thus, the centroid for the given term can help to provide valuable information as to which portion of the document that the given term pertains.

The statistical analyzer 120 can include a standard deviation analyzer 123 to compute whether occurrences of a corresponding term are tightly grouped near a computed centroid for the corresponding term or whether the occurrences of the corresponding term are scattered widely throughout the document with respect to the centroid. The tightly grouped distributions can be used to identify locations of different themes in the document. The widely scattered terms can be used to identify general themes of the overall document.

More discussion about the above functions can be found in related application Ser. No. 11/728,069, entitled Method and Apparatus For Performing Targeted Advertising in Documents," as filed on Mar. 23, 2007, the entire teachings of which are incorporated herein by this reference.

As mentioned above, the information derived by statistical analyzer 120 can be useful in determining which terms (e.g., words or phrases) in a corresponding document are most representative of the corresponding document. For example, a document may include many more occurrences of the word "museum" than the word "Canada". However, the document may include a substantial number of occurrences of the word "Canada" widely throughout the document, while the term "museum" may only be used in a small range of the document (e.g., a paragraph as opposed to being on each of multiple pages). In such an instance, a conventional term analyzer may mistakenly categorize the document as being more about "museum" instead of "Canada".

In contradistinction to conventional methods, embodiments herein include use of the statistical analyzer 120 to more usefully rank the terms than by mere term frequency. For example, the statistical analyzer 120 takes into account the range, centroid, and/or standard deviation information of each of the corresponding terms in a document to derive a set of top ranked terms 125.

In the above example, the term "Canada" can be given greater weight in an outputted ranking of terms because it is used in a wider range of the document as opposed to use of the word "museum" which may appear many times in the document such as in a single paragraph amongst many paragraphs in the document.

Note that the term "museum" may be quite useful for selecting a corresponding theme (as will be discussed later in this specification) when a viewer happens to be viewing a region of a given document that has a high density of the word "museum" appearing in the document. Thus, embodiments herein include taking into account relative locations of a given word or phrase in a document in order to determine a ranking of the word or phrase relative to other words or phrases.

As mentioned above, to produce keywords or categories associated with a document for advertising purposes, the most useful keywords and categories will be those that capture an essence of the document or corresponding sections of the document as the case may be. Use of statistical analyzer 120 as discussed above helps to achieve this end by taking into account a range where a given term can be found as well its frequency in a document.

Figure 3:
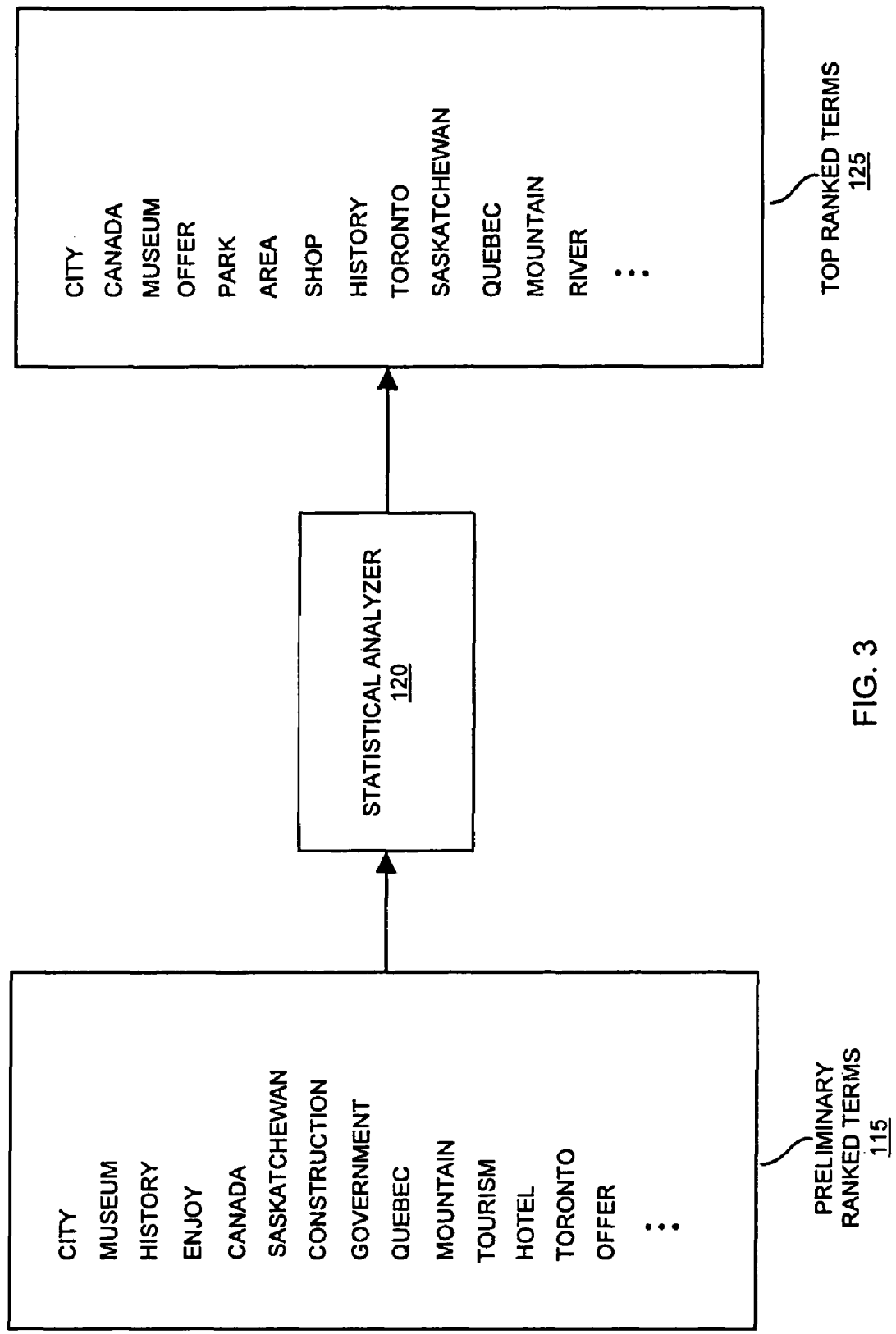
FIG. 3 is an example diagram illustrating a re-ranking of most relevant terms in a document based on a distribution and frequency analysis according to embodiments herein.

FIG. 3 is an example diagram illustrating re-ranking of terms in order of importance based on application of the statistical analyzer 120 according to embodiments herein. In the context of the present example, assume that a document being analyzed produces a set of preliminary ranked terms 115, which is generated based on only term frequency. As shown, statistical analyzer 120 performs processing such as analyzing the location information (e.g., range, centroid, and standard deviation) associated with each of the preliminary ranked terms 115 as discussed above to generate a new set of top ranked terms 125. As previously discussed, the list of ranked terms 125 generated by statistical analyzer 120 more likely represents an essence of a corresponding document because it takes into account the location information associated with the terms.

Referring again to FIG. 1, in addition to statistical analyzer 120, resource analyzer 140 also includes a theme generator 150 such as an Oracle™ text engine or the Sedona™ ontology classifier.

Based on input such as document terms 105-2, theme generator 150 produces a list of themes 155 for a corresponding document 105-1. An example of the list of themes is shown in FIG. 4.

Figure 4:
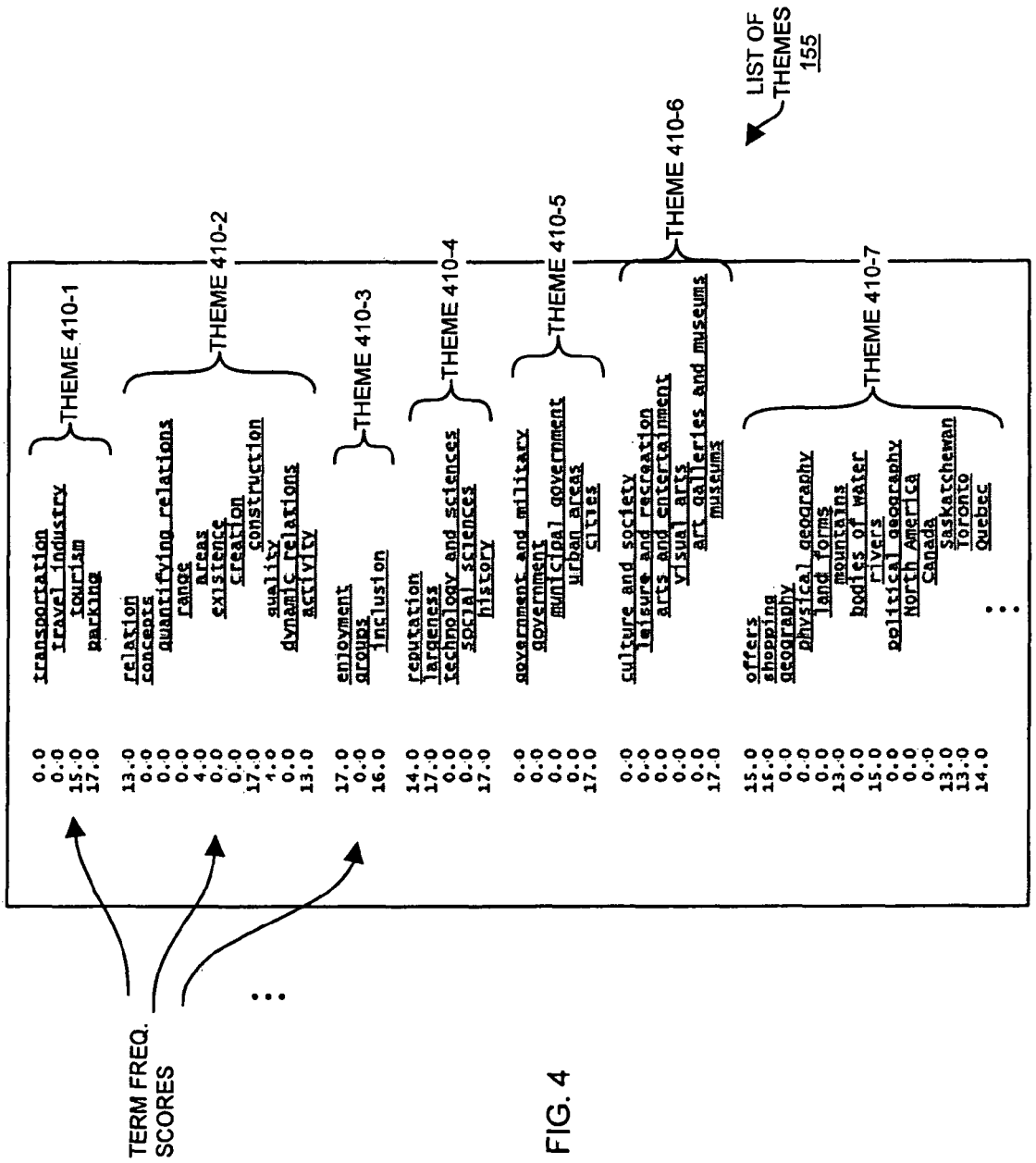
FIG. 4 is an example diagram illustrating a generated list of themes (e.g., category information) for a document according to embodiments herein.

As shown in FIG. 4, each entry in the list of themes 155 (e.g., theme 410-1, theme 410-2, theme 410-3, theme 410-4, theme 410-5, theme 410-6, theme 410-7, etc.) has a corresponding numerical value representing term frequency score of the terms in the document. A numerical value of 0.0 indicates that the corresponding term for the entry was not explicitly found in the document 105-1, but that actual themes (shown as indented) infer the more general categories for the terms. For example, the term or class "transportation" and "travel industry" were not found in the document. These terms represent categories selected by the theme generator 150 in response to detecting a significant presence (e.g., because of respective numerical values 15.0 and 17.0) of the terms "tourism" and "parking" in the document 105-1. The higher the numerical value of the term frequency score, the more often the term appears in the document 105-1.

In a similar way as discussed above, the theme generator 150 generates themes 410 for each of the terms appearing most often in the document 105-1.

Referring again to FIG. 1, resource analyzer 140 also includes a metadata generator 160 for producing document metadata 180 according to embodiments herein.

The metadata generator 160 produces document metadata 160 to include a first set of themes 181 (FIG. 5), which is basically the list of themes 155 (FIG. 4) ordered in accordance with the a best guess as to an importance of the themes. An example of the first set of themes is shown in FIG. 5.

In general, the first set of themes 181 is a ranking of the themes based on term frequency without taking into account a distribution of where the terms are found in the document. The first set of themes can be used to generate keywords/categories associated with a corresponding document. However, as discussed above, they may not accurately reflect the essence or "aboutness" of a document, especially for any given page, section, or overall document.

To produce second set of themes 182 (e.g., a re-ranking of the list of themes 155), which more accurately represent an essence of the document 105-1, the metadata generator 160 "multiplies" or cross references the top ranked terms 125 derived from the frequency and distribution analysis with the list of themes 155 produced by theme generator 150.

For example, top ranked terms 125 (FIG. 3) indicates that the term "city" found in document 105-1 has the highest relevance based on the statistical analysis as discussed above. To identify the top theme in list of themes 155, the metadata generator 160 searches for the term "city" (or close derivation thereof) amongst the themes 410 (FIG. 4) in list of themes 155. In the context of the present example, the metadata generator 160 identifies that theme 410-5 as the theme most accurately reflecting an essence of the document 105-1 because it includes the term "cities".

Additionally, top ranked terms 125 (FIG. 3) indicates that the term "Canada" found in document 105-1 has the second highest relevance based on the distribution analysis as discussed above. To identify the second top theme in list of themes 155, the metadata generator 160 searches for the term "Canada" (or close derivation thereof) amongst the themes 410 (FIG. 4) in list of themes 155. In the context of the present example, the metadata generator 160 identifies that theme 410-7 as the second theme most accurately reflecting an essence of the document 105-1 because it includes the term "Canada".

In a similar manner, the metadata generator 160 repeats the above process to re-rank list of themes 155 into the second set of themes 182 for inclusion in the document metadata 180. As previously discussed, the second set of themes 182 more likely represents an essence of the document 105-1 because it takes into account the distribution of terms.

A more specific example of the re-ranking of terms and second set of themes 182 is shown in FIG. 6. Note again that the second set of themes 182 more closely represents an essence of the document because it takes into account distribution of terms. As shown, the top ranked terms 125 are shown in descending order. The bracketed number in the re-ranking column indicates a corresponding number in the first set of themes 181 (in FIG. 5). Theme [01] in first set of themes 181 as shown in FIG. 6 is the first ranked theme in the second set of themes 182 of FIG. 6. Theme [21] in first set of themes 181 of FIG. 5 is the second ranked theme in the second set of themes 182 of FIG. 6. Theme [03] in first set of themes 181 of FIG. 5 is the third ranked theme in the second set of themes 182 of FIG. 6. Theme [08] in first set of themes 181 of FIG. 5 is the fourth ranked theme in the second set of themes 182 of FIG. 6. Theme [05] in first set of themes 181 of FIG. 5 is the fifth ranked theme in the second set of themes 182 of FIG. 6, and so on.

Referring again to FIG. 1, note that the metadata generator 160 can produce the document metadata 180 to include additional useful document essence information such as permutation information 183, general summary information 184, and theme combination information 185. Such information is provided in addition to the first set of themes 181 and the second set of themes 182 and enables an advertisement server to draw from a wide variety of useful information to produce targeted advertisements.

FIG. 6 is an example diagram illustrating permutation information 183 according to embodiments herein. Metadata generator 160 produces permutation information 183 (e.g., keyword groupings) based on permutations of the top ranked terms 125. Note that although present example illustrates permutations including different groupings of two ranked terms, permutation groupings can include any sized groupings of terms.

FIG. 7 is an example diagram illustrating general summary information 184 according to embodiments herein. General summary information 184 represents a portion of text selected from the document 105-1 that is thought to most accurately represent an essence of the document 105-1. Theme combination information 185 includes permutations of terms found in the themes in first set of themes 181.

Figure 8:
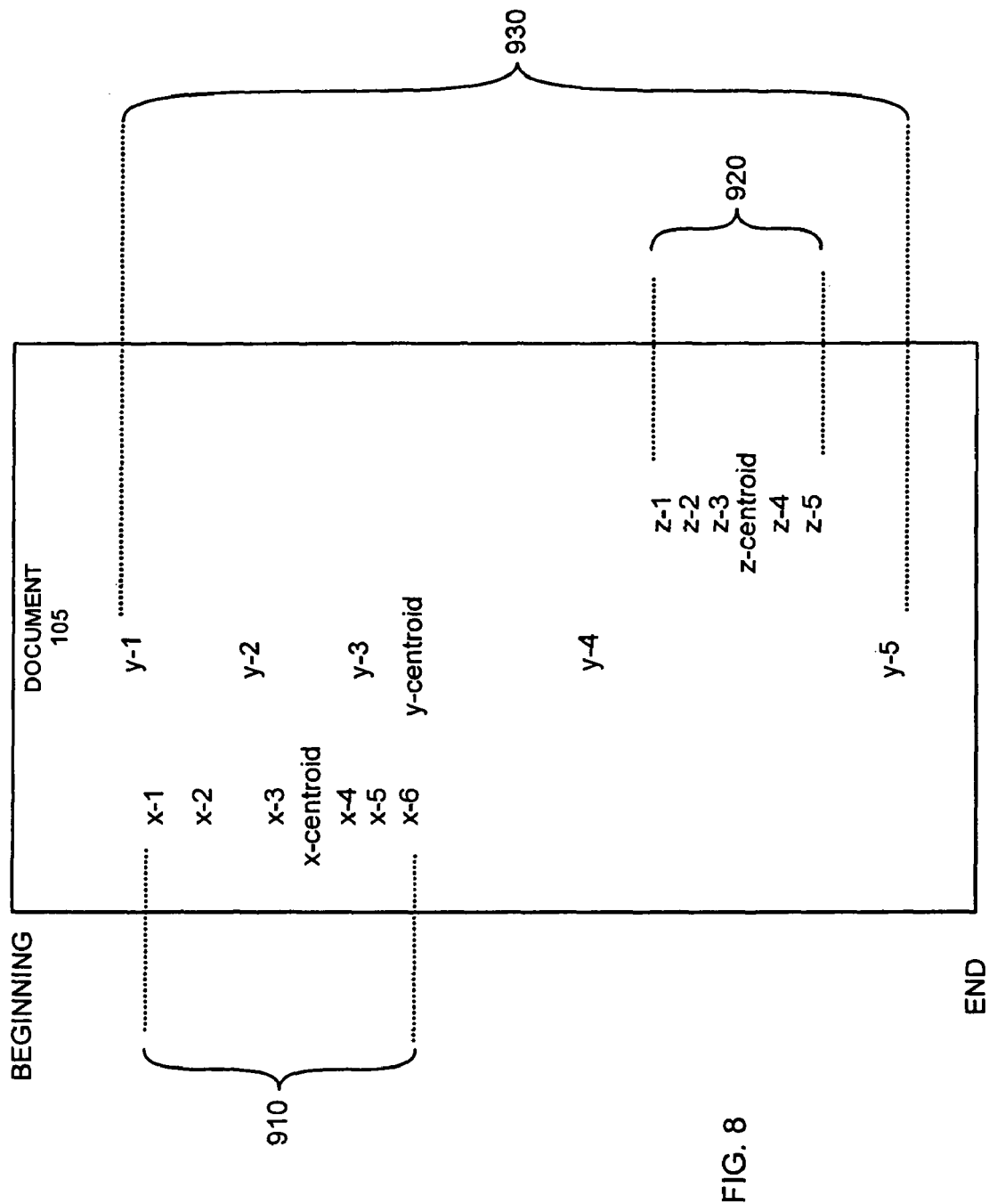
FIG. 8 is an example diagram illustrating a term analysis indicating different themes in a document according to embodiments herein.

FIG. 8 is an example diagram illustrating a term analysis indicating different themes in a document according to embodiments herein.

Assume that x represents a first term (e.g., word, phrases etc.) found in the document 105, y represents a second term (e.g., word, phrases etc.) found in the document 105, z represents a third term (e.g., word, phrases etc.) found in the document 105.

The number following the term indicates that occurrence and/or position in the document. For example, x-1 represents the first occurrence of term x; x-2 represents the second occurrence of term x; x-3 represents the third occurrence of term x, and so on. The value of x-centroid (as generated by statistical analyzer 120) indicates an average weighted location where the term x is found in the document 105.

In a similar manner, y-1 represents the first occurrence of term y; y-2 represents the second occurrence of term y; y-3 represents the third occurrence of term y, and so on.

The value of y-centroid (as generated by statistical analyzer 120) indicates an average weighted location where the term y is found in the document 105.

In a similar manner, z-1 represents the first occurrence of term z; z-2 represents the second occurrence of term z; z-3 represents the third occurrence of term z, and so on. The value of z-centroid (as generated by statistical analyzer 120) indicates an average weighted location where the term z is found in the document 105.

This example figure illustrates how selection of terms having the highest frequency does not necessarily produce a term that most likely represents an essence of the document 105. For example, the occurrence of term x in range 910 is relatively narrow and is not necessarily the best term (e.g., keyword) to represent the document 105. Conversely, term y falls within range 930 and occurs often and thus may be a good candidate for selecting as a term (e.g., keyword) representing an essence of the document 105.

Term z also occurs at a high frequency. However, it also falls within a fairly narrow range and is not necessarily the best candidate to represent the essence of the document. However, note again that the statistical analysis indicating centroids, ranges, etc. associated with the terms can indicate particular regions about the document. For example, range 910 of document 105 has a corresponding theme most likely about term x and term y. Range 920 of document 105 has a corresponding theme most likely about term z and term y.

Using this distribution information, an advertisement distributor can identify corresponding themes associated with term x and term y to distribute targeted advertisements to viewers viewing range 910 of document 105. In a similar manner, using this distribution information, an advertisement distributor can identify corresponding themes associated with term z and term y to distribute targeted advertisements to viewers viewing range 920 of document 105. If desired, the advertisement distributor can distribute advertisements pertaining to the document as a whole based on a theme associated with term y.

Figure 2:
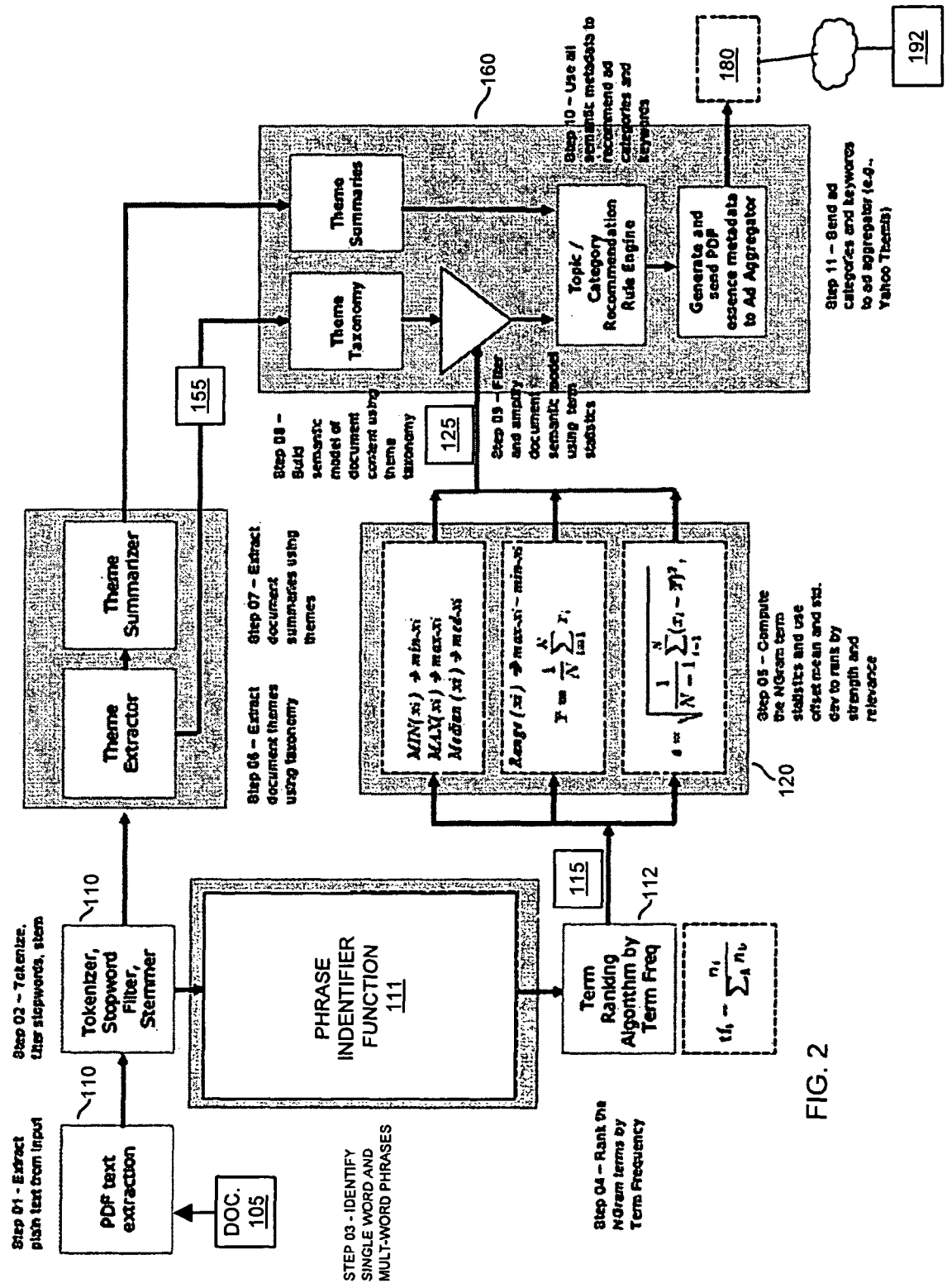
FIG. 2 is an example diagram of a resource analyzer environment and corresponding steps to identify appropriate themes associated with a document according to embodiments herein.

FIG. 2 is an example diagram illustrating a processing environment 200 and corresponding steps to produce document metadata 180 according to embodiments herein.

In step 1, the document processor 110 extracts text from a document 105 being analyzed.

In step 2, the document processor 110 performs operations such as tokenizing of text, removal of stopwords, and producing of stems for extracted terms.

In step 3, the phrase identifier function 111 identifies a presence of phrases in the document 105 including single word phrases and multi-word phrases. More details regarding an example of the phrase identifier function can be found in related United States Patent Application entitled "DOCUMENT ANALYSIS AND MULTI-WORD TERM DETECTOR," application Ser. No. 11/946,637, filed on Nov. 28, 2007, the entire teachings of which are incorporated herein by this reference.

In step 4, the term analyzer 112 ranks the phrases by term frequency to produce preliminary ranked terms 115. Most useful terms can be identified via a TF-IDF analysis.

In step 5, the statistical analyzer 120 computes statistical information associated with the top ranked terms 115 based on a distribution analysis as discussed above.

In step 6, the theme extractor of theme generator 150 extracts document themes using a corresponding taxonomy.

In step 7, the theme summarizer of theme generator 150 extracts a document summary from the document 105 using the extracted themes.

In step 8, the metadata generator 160 builds a semantic model of the document 105 using a corresponding theme taxonomy.

In step 9, the metadata generator 160 filters and amplifies the document semantic model using term statistics derived by statistical analyzer 120.

In step 10, the metadata generator 160 uses the semantic model metadata to recommend advertisement categories and keywords for association with the document 105.

In step 11, the resource analyzer 140 sends the metadata 180 to an advertisement aggregator 192 such as those provided by search engine companies. The advertisement aggregator 192 uses the metadata 180 for targeting of advertisements to users who request the document 105 for viewing.

Figure 9:
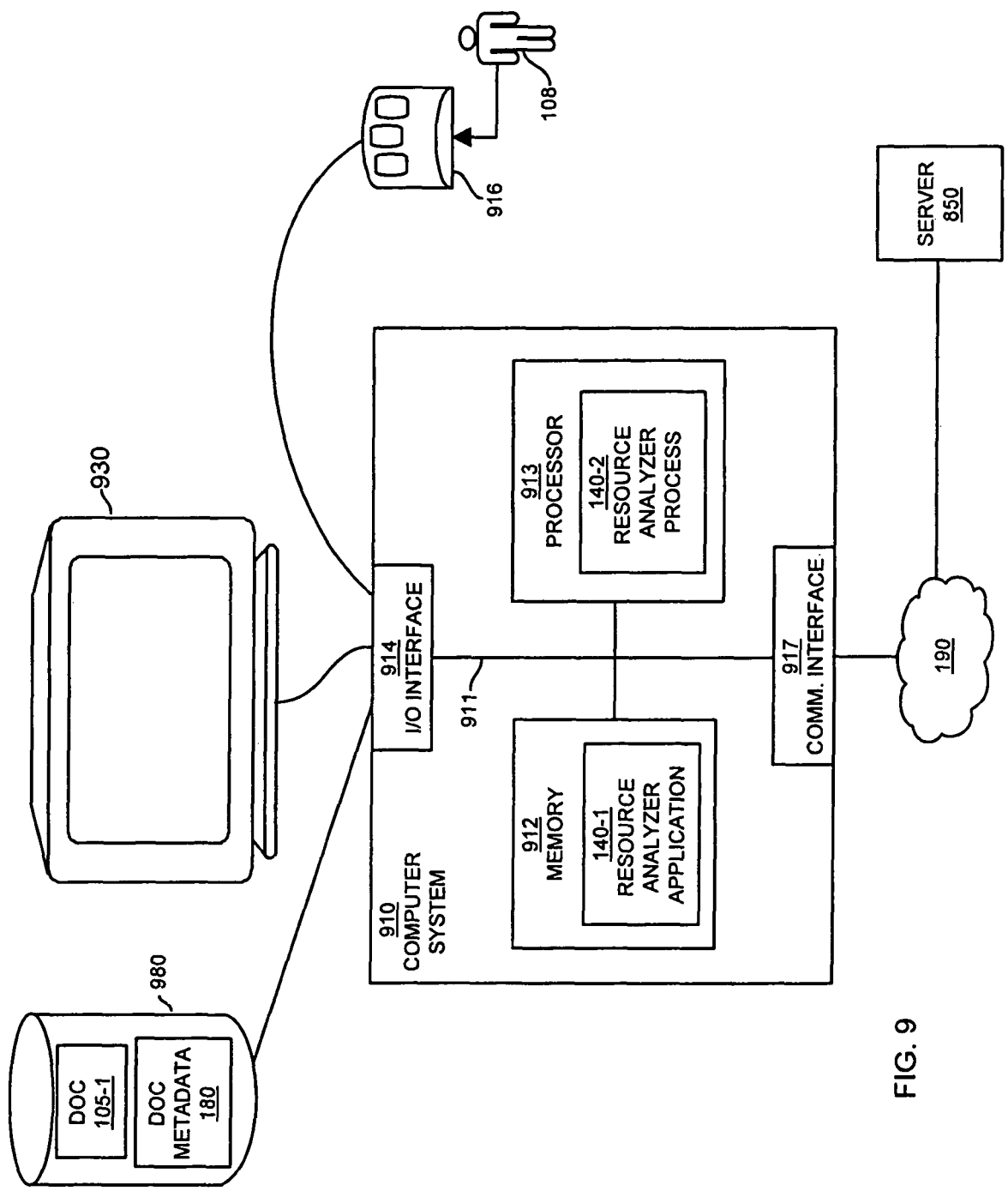
FIG. 9 is a diagram of an example architecture for executing software code according to embodiments herein.

FIG. 9 is a block diagram of an example architecture of a respective computer system 910 (e.g., representing one or more computers, processes, etc.) for implementing a resource analyzer 140 (e.g., a resource analyzer application 140-1 and/or resource analyzer process 140-2) according to embodiments herein. Computer system 910 can include computerized devices such as personal computers, servers that make up a website, workstations, portable computing devices, consoles, network terminals, processing devices etc.

Note that the following discussion provides a basic embodiment indicating how to carry out functionality associated with the resource analyzer 140 as discussed above and below. However, it should be noted that the actual configuration for carrying out the resource analyzer 140 can vary depending on a respective application. For example, as previously discussed, computer system 910 can also include multiple computers that carry out the processing as described herein.

As shown, computer system 910 of the present example includes an interconnect 911 that couples a memory system 912, a processor 913, I/O interface 914, and a communications interface 917.

I/O interface 914 provides connectivity to peripheral devices 916 (if such devices are present) such as a keyboard, mouse (e.g., selection tool to move a cursor), display screen 930, etc. User 108 can provide input to computer system 910 to control operations associated with generation of metadata according to embodiments herein.

Communications interface 917 enables the resource analyzer 140 of computer system 910 to communicate over network 190 and, if necessary, retrieve data required to generate metadata according to embodiments herein. Computer system 910 also can be configured to distribute document metadata 180 over network 190 to a server 850 such as an advertisement aggregator that utilizes the document metadata 180 for targeted advertising as described herein.

As shown, memory system 912 is encoded with resource analyzer application 140-1 that supports functionality as discussed above and as discussed further below. Resource analyzer application 140-1 (and/or other resources as described herein) can be embodied as software code such as data and/or logic instructions (e.g., code stored on a tangible computer readable medium such as memory or on another computer readable medium such as a disk) that supports processing functionality according to different embodiments described herein. During operation of one embodiment, processor 913 accesses memory system 912 via the use of interconnect 911 in order to launch, run, execute, interpret or otherwise perform the logic instructions of the resource analyzer application 140-1. Execution of the resource analyzer application 140-1 produces processing functionality in resource analyzer process 140-2. In other words, the resource analyzer process 140-2 represents one or more portions of the resource analyzer application 140-1 performing within or upon the processor 913 in the computer system 910.

It should be noted that, in addition to the resource analyzer process 140-2 that carries out method operations as discussed herein, other embodiments herein include the resource analyzer application 140-1 itself (i.e., the un-executed or non-performing logic instructions and/or data). The resource analyzer application 140-1 may be stored on a computer readable medium (e.g., a repository) such as a floppy disk, hard disk or in an optical medium. According to other embodiments, the resource analyzer application 140-1 can also be stored in a memory type system such as in firmware, read only memory (ROM), or, as in this example, as executable code within the memory system 912 (e.g., within Random Access Memory or RAM).

In addition to these embodiments, it should also be noted that other embodiments herein include the execution of the resource analyzer application 140-1 in processor 913 as the resource analyzer process 140-2. Thus, those skilled in the art will understand that the computer system 910 can include other processes and/or software and hardware components, such as an operating system that controls allocation and use of hardware resources.

Functionality supported by computer system 910 and, more particularly, functionality associated with resource analyzer application 140-1 and resource analyzer process 140-2 will now be discussed via flowcharts in FIGS. 10 through 14. For purposes of the following discussion, the resource analyzer 140 (e.g., resource analyzer application 140-1 and/or resource analyzer process 140-2) or other appropriate entity generally performs steps in the flowcharts.

Note that there will be some overlap with respect to concepts discussed above for FIGS. 1 through 8. Also, note that the steps in the below flowcharts need not always be executed in the order shown.

Figure 10:
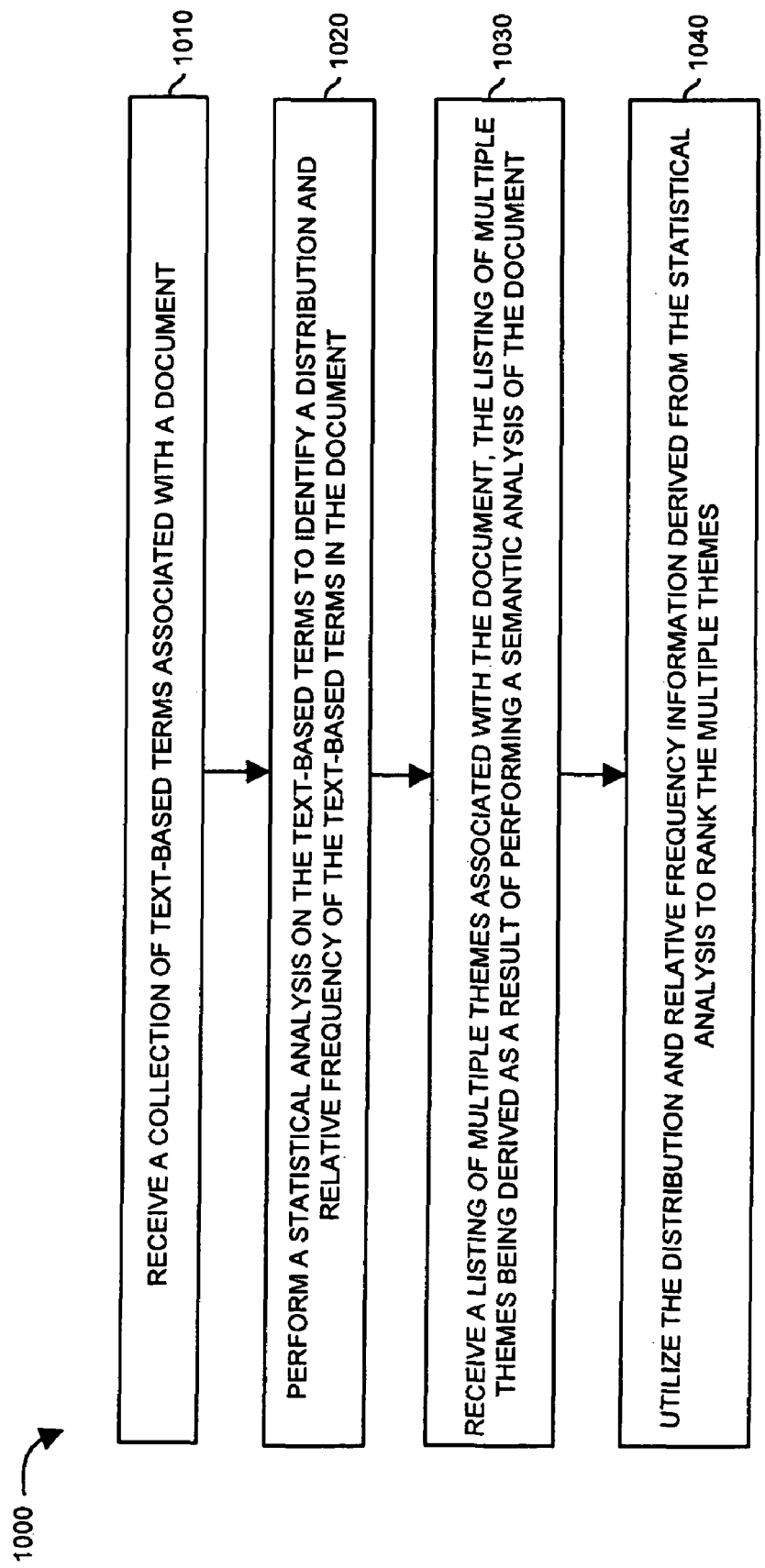
FIG. 10 is a flowchart illustrating an example of a method for generating essence metadata for one or more corresponding documents according to embodiments herein.

FIG. 10 is a flowchart 1000 illustrating a technique of implementing a resource analyzer 140 and related functionality according to embodiments herein. Note that flowchart 1000 of FIG. 10 and corresponding text below may overlap with and refer to some of the matter previously discussed with respect to FIGS. 1-9. Also, in addition to resource analyzer 140, note that the steps in flowchart 1000 can be performed by any of the additional entities associated with resource analyzer 140 such as document metadata generator 160.

In step 1010, the statistical analyzer 120 of resource analyzer 140 receives a collection of text-based terms (e.g., revised document terms 105-2) associated with a document 105-1.

In step 1020, the statistical analyzer 120 of resource analyzer 140 performs a statistical analysis on the text-based terms (e.g., revised document terms 105-2) to identify a distribution and relative frequency of the text-based terms in the document 105-1.

In step 1030, the metadata generator 160 of resource analyzer 140 receives a listing of multiple themes 155 associated with the document 105-1. In one embodiment, the listing of multiple themes 155 is derived as a result of performing a semantic analysis of the document 105-1 by theme generator 150.

In step 1040, the metadata generator 160 of resource analyzer 140 utilizes the distribution and relative frequency information (e.g., top ranked terms 125) derived from the statistical analysis to rank the multiple themes 155 for inclusion in document metadata 180.

Figure 11:
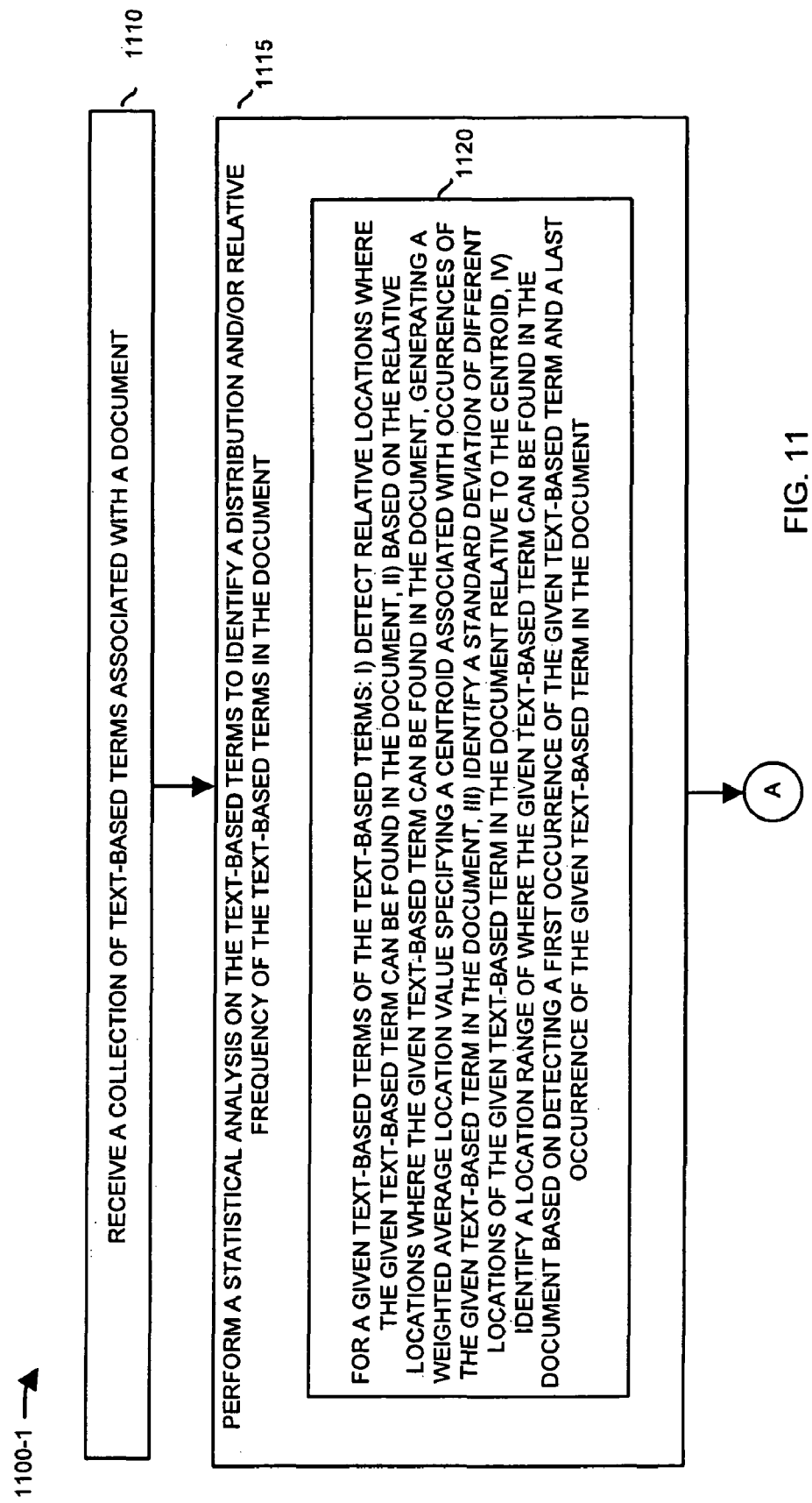
FIGS. 11 and 12 combine to form a flowchart illustrating an example of a method for generating essence metadata for each of one or more corresponding documents according to embodiments herein.
Figure 12:
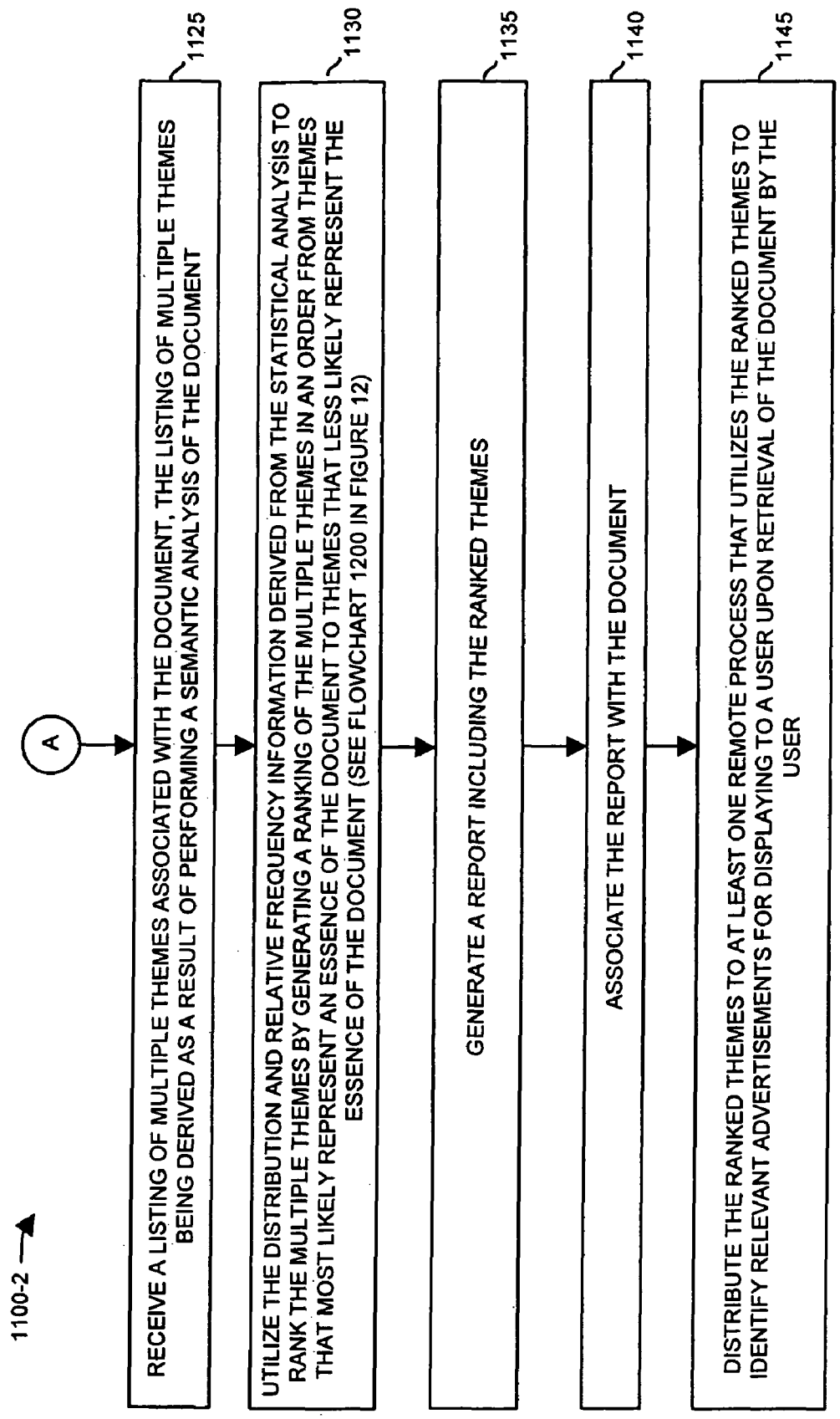

FIGS. 11 and 12 combine to form a flowchart 1100 (e.g., flowchart 1100-1 and flowchart 1100-2) illustrating a technique supporting metadata generation according to embodiments herein. Note that flowchart 1100-1 and 1100-2 and corresponding text below will make reference to and may overlap with matter previously discussed with respect to FIGS. 1-9.

In step 1110, the statistical analyzer 120 of resource analyzer 140 receives a collection of text-based terms (e.g., preliminary ranked terms 115) associated with document 105-1.

In step 1115, via statistical analyzer 120, the resource analyzer 140 performs a statistical analysis on text-based terms in the document 105-1 to identify a distribution and/or relative frequency of the text-based terms in the document 105-1.

In sub-step 1120, for a given text-based term of the text-based terms in the document 105-1, the statistical analyzer 120 of resource analyzer 140: i) detects relative locations where the given text-based term can be found in the document 105-1, ii) based on the relative locations where the given text-based term can be found in the document, generates a weighted average location value specifying a centroid associated with occurrences of the given text-based term in the document 105-1, iii) identifies a standard deviation of different locations of the given text-based term in the document 105-1 relative to the centroid, iv) identifies a location range of where the given text-based term can be found in the document 105-1 based on detecting a first occurrence of the given text-based term and a last occurrence of the given text-based term in the document 105-1.

In step 1125, the metadata generator 160 of resource analyzer 140 receives a listing of multiple themes 155 associated with the document 105-1 as generated by theme generator 150. The listing of multiple themes 155 can be derived as a result of performing a semantic analysis of the document 105-1.

In step 1130, the metadata generator 160 of resource analyzer 140 utilizes the distribution and relative frequency information derived from the statistical analysis to rank the multiple themes in listing 155 by generating a ranking (or re-ranking) of the multiple themes in an order from themes that most likely represent an essence of the document to themes that less likely represent the essence of the document. This process is more particularly discussed in flowchart 1300 of FIG. 13.

In step 1135, metadata generator 160 of resource analyzer 140 generates a document metadata 180 including the ranked themes (e.g., second set of themes 182).

In step 1140, the resource analyzer 140 associates the document metadata 180 with the document 105-1 for purposes such as targeted advertising.

In step 1145, the resource analyzer 140 distributes the document metadata 180 and ranked themes (e.g., second set of themes 182) to one or more remote servers that utilizes the ranked themes to identify relevant advertisements for displaying to a user upon retrieval of the document 105-1 by the user.

Figure 13:
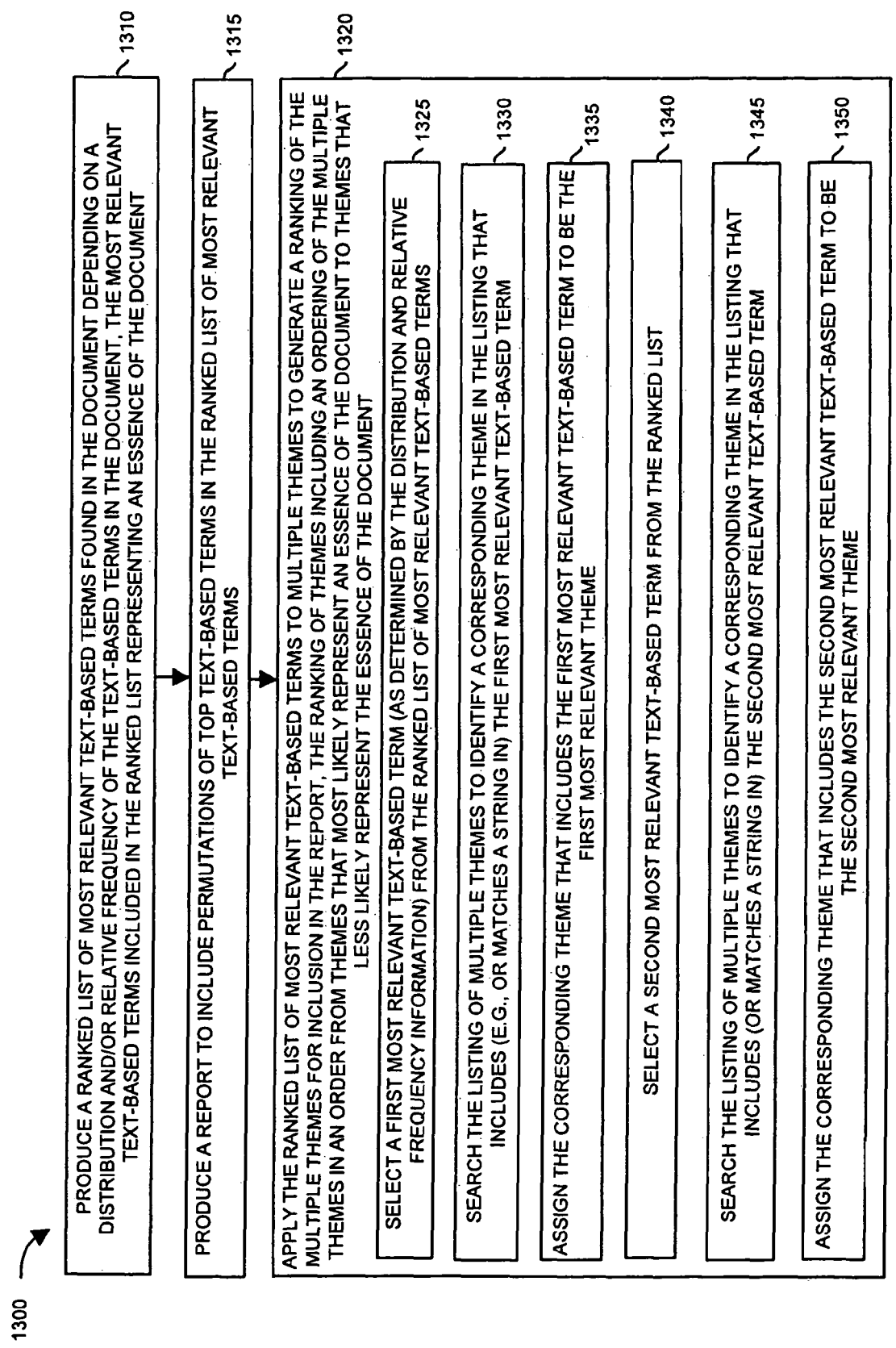
FIG. 13 is a flowchart illustrating an example of a method for generating essence metadata for each of one or more corresponding documents according to embodiments herein.

FIG. 13 is a flowchart 1300 illustrating an example technique supporting metadata generation according to embodiments herein. Similar to the other flowcharts as discussed above, the corresponding text below will make reference to and may overlap with matter previously discussed.

In step 1310, the statistical analyzer 120 of resource analyzer 140 produces a ranked list of most relevant text-based terms (e.g., top ranked terms 125) found in the document 105-1 depending on a distribution and/or relative frequency of the text-based terms in the document 105-1. The most relevant text-based terms included in the ranked list (e.g., top ranked terms 125) represent an essence of the document 105-1.

In step 1315, the document metadata generator 160 of resource analyzer 140 produces document metadata 180 to include permutations (e.g., permutation information) derived from top text-based terms in the ranked list of most relevant text-based terms (e.g., top ranked terms 125).

In step 1320, the document metadata generator 160 of resource analyzer 140 applies the ranked list of most relevant text-based terms (e.g., ranked terms 125) to list of themes 155 to generate a ranking of the multiple themes (as second set of themes 182) for inclusion in the document metadata 180. The second set of themes 182 includes an ordering of the multiple themes in an order from themes that most likely represent an essence of the document to themes that less likely represent the essence of the document. The first set of themes 181 can be ordered in a manner as generated by theme generator 150. An example of ranking list of themes 155 is described below in sub-steps 1325-1350.

In sub-step 1325, the document metadata generator 160 of resource analyzer 140 selects a first most relevant text-based term (as determined by the distribution and relative frequency information) from the ranked list 125 of most relevant text-based terms.

In sub-step 1330, the document metadata generator 160 of resource analyzer 140 searches the listing of multiple themes 155 to identify a corresponding theme in the listing 155 that includes (e.g., or matches a string in) the first most relevant text-based term from list 125.

In sub-step 1335, the document metadata generator 160 of resource analyzer 140 assigns the corresponding theme in list 155 that includes the first most relevant text-based term to be the first most relevant theme in second set of themes 182.

In sub-step 1340, the document metadata generator 160 of resource analyzer 140 selects a second most relevant text-based term from the ranked list 125 as derived by statistical analyzer 120.

In sub-step 1345, the document metadata generator 160 of resource analyzer 140 searches the listing of multiple themes 155 to identify a corresponding theme in the listing 155 that includes (or matches a string in) the second most relevant text-based term retrieved from list 125.

In sub-step 1350, document metadata generator 160 of the resource analyzer 140 assigns the corresponding theme that includes the second most relevant text-based term to be the second most relevant theme in the second set of themes 182.

The above process is repeated to create a re-ranking of the first set of themes 181 into the second set of themes 182.

Figure 14:
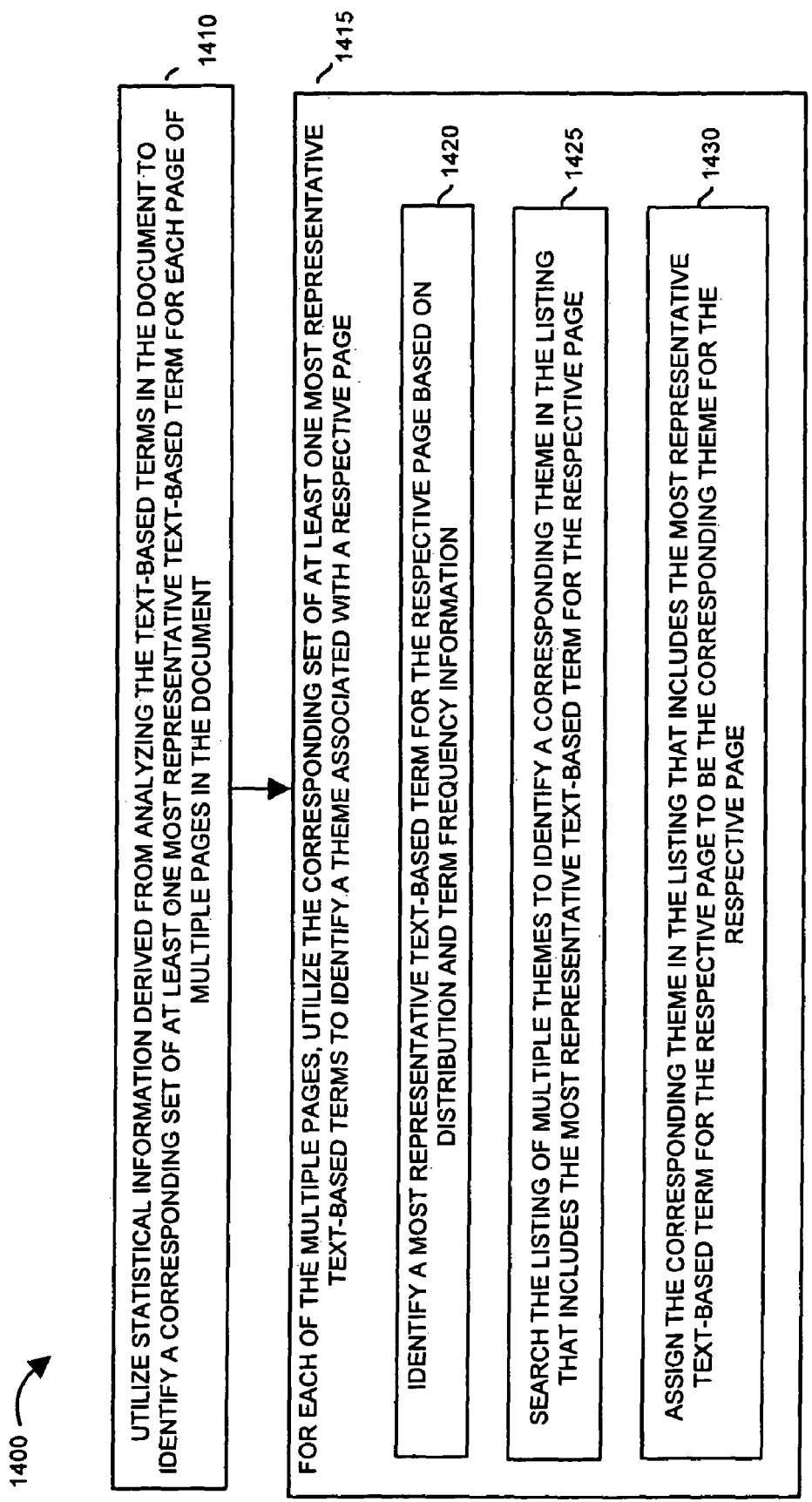
FIG. 14 is a flowchart illustrating an example of a method for generating essence metadata for each of one or more corresponding documents according to embodiments herein.

FIG. 14 is a flowchart 1400 illustrating an example technique supporting metadata generation according to embodiments herein. Similar to the other flowcharts as discussed above, the corresponding text below will make reference to and may overlap with matter previously discussed.

In step 1410, the document metadata generator 160 of resource analyzer 140 utilizes statistical information derived from analyzing the text-based terms in the document 105-1 to identify a corresponding set of at least one most representative text-based term for each page of multiple pages in the document 105-1.

In step 1415, for each of the multiple pages in document 105-1, the document metadata generator 160 utilizes the corresponding set of at least one most representative text-based terms in list 125 to identify a theme associated with a respective page. An example of ranking list of themes 155 on a page basis is described below in sub-steps 1420-1430.

In sub-step 1420, document metadata generator 160 of the resource analyzer 140 identifies a most representative text-based term for the respective page of the document (or section of the document as the case may be) based on distribution and term frequency information In sub-step 1425, the document metadata generator 160 searches the listing of multiple themes 155 to identify a corresponding theme in the listing 155 that includes the most representative text-based term for the respective page.

In sub-step 1430, the document metadata generator 160 of the resource analyzer 140 assigns the corresponding theme in the listing 155 that includes the most representative text-based term for the respective page to be the corresponding theme for the respective page.

Note again that techniques herein are well suited for targeted advertising applications and creation of document metadata (e.g., keywords) associated with a text-based documents as described herein. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method comprising:
   receiving a collection of text-based terms associated with a document;
   performing a statistical analysis on the text-based terms to identify a distribution and relative frequency of the text-based terms in the document;
   receiving a listing of multiple themes associated with the document, the listing of multiple themes being derived as a result of performing a semantic analysis of the document; and
   utilizing the distribution and relative frequency information derived from the statistical analysis to rank the multiple themes.

2. The method as in claim 1, wherein performing the statistical analysis on the text-based terms to identify the distribution includes:
   for a given text-based term, identifying a location range of where the given text-based term can be found in the document based on detecting a first occurrence of the given text-based term and a last occurrence of the given text-based term in the document.

3. The method as in claim 1, wherein performing the statistical analysis on the text-based terms to identify the distribution includes:
   for a given text-based terms of the text-based terms, detecting relative locations where the given text-based term can be found in the document; and
   based on the relative locations where the given text-based term can be found in the document, generating a weighted average location value specifying a centroid associated with occurrences of the given text-based term in the document.

4. The method as in claim 3, wherein performing the statistical analysis on the text-based terms to identify the distribution includes:
   for a given text-based term, identifying a standard deviation of different locations of the given text-based term in the document relative to the centroid.

5. The method as in claim 1, wherein utilizing the distribution and relative frequency information associated with the statistical analysis to rank the multiple themes includes:
   generating a ranking of the multiple themes in an order from themes that most likely represent an essence of the document to themes that less likely represent the essence of the document.

6. The method as in claim 5 further comprising:
   distributing the ranked themes to at least one remote process that utilizes the ranked themes to identify relevant advertisements for displaying to a user upon retrieval of the document by the user.

7. The method as in claim 1, wherein utilizing the distribution and relative frequency information associated with the statistical analysis to rank the multiple themes includes:
   producing a ranked list of most relevant text-based terms found in the document; and
   applying the ranked list of most relevant text-based terms to the multiple themes to generate a ranking of the multiple themes in an order from themes that most likely represent an essence of the document to themes that less likely represent the essence of the document.

8. The method as in claim 7, wherein applying the ranked list of most relevant text-based terms to the multiple themes includes:
   selecting a most relevant text-based term from the ranked list;
   searching the listing of multiple themes to identify a corresponding theme in the listing that includes the most relevant text-based term; and
   assigning the corresponding theme that includes the most relevant text-based term to be the most relevant theme.

9. The method as in claim 8, wherein applying the ranked list of most relevant text-based terms to the multiple themes further includes:
   identifying each additional most relevant theme by repeating steps of:
      selecting a next most relevant text-based term from the ranked list;
      searching the listing of multiple themes to identify a corresponding theme in the listing that includes the next most relevant text-based term; and
      assigning the corresponding theme that includes the next most relevant text-based term to be the next most relevant theme.

10. The method as in claim 1 further comprising:
    generating document metadata including the ranked themes;
    associating the document metadata to the document; and
    distributing the document metadata to at least one remote process that utilizes the ranked themes to identify relevant advertisements for displaying to a user upon retrieval of the document by the user.

11. The method as in claim 10 further comprising:
    utilizing the statistical analysis to produce a ranked list of most relevant text-based terms found in the document, the most relevant text-based terms representing an essence of the document; and
    producing the document metadata to include permutations of top text-based terms in the ranked list of most relevant text-based terms.

12. The method as in claim 1 further comprising:
    utilizing the statistical information to identify a corresponding set of at least one most representative text-based term for each page of multiple pages in the document; and
    for each of the multiple pages, utilizing the corresponding set of at least one most representative text-based terms to identify a theme associated with a respective page that enables matching of a highly relevant advertisement with the respective page.

13. The method as in claim 12, wherein utilizing the corresponding set of at least one most representative text-based term to identify the theme associated with the respective page includes:
    identifying a most representative text-based term for the respective page;
    searching the listing of multiple themes to identify a corresponding theme in the listing that includes the most representative text-based term for the respective page; and
    assigning the corresponding theme in the listing that includes the most representative text-based term for the respective page to be the corresponding theme for the respective page.

14. A method comprising:
receiving a ranking of text-based terms associated with a document, the ranking being based on a statistical analysis of the text-based terms in the document;
receiving a listing of multiple themes associated with the document, the listing of multiple themes being derived as a result of performing a semantic analysis of the document; and
utilizing the ranking of the text-based terms to rank the multiple themes.

15. The method as in claim 14, wherein the statistical analysis indicates a distribution and relative frequency of where the text-based terms appear in the document.

16. The method as in claim 15, wherein utilizing the ranking of the text-based terms to rank the multiple themes includes:
selecting a text-based term from the ranking of the text-based terms; and
utilizing the text-based term to identify one of the multiple themes for associating with the document.

17. A computer readable medium having computer code thereon, the medium comprising:
instructions for receiving a collection of text-based terms associated with a document;
instructions for performing a statistical analysis on the text-based terms to identify a distribution and relative frequency of the text-based terms in the document;
instructions for receiving a listing of multiple themes associated with the document, the listing of multiple themes being derived as a result of performing a semantic analysis of the document; and
instructions for utilizing the distribution and relative frequency information derived from the statistical analysis to rank the multiple themes.

18. The computer readable medium as in claim 17, wherein the instructions for utilizing the distribution and relative frequency information associated with the statistical analysis to rank the multiple themes includes:
instructions for producing a ranked list of most relevant text-based terms found in the document; and
instructions for applying the ranked list of most relevant text-based terms to the multiple themes to generate a ranking of the multiple themes in an order from themes that most likely represent an essence of the document to themes that less likely represent the essence of the document.

19. The computer readable medium as in claim 18, wherein the instructions for applying the ranked list of most relevant text-based terms to the multiple themes includes:
instructions for selecting a first most relevant text-based term from the ranked list;
instructions for searching the listing of multiple themes to identify a corresponding theme in the listing that includes the first most relevant text-based term; and
instructions for assigning the corresponding theme that includes the first most relevant text-based term to be the first most relevant theme.

20. The computer readable medium as in claim 19, wherein the instructions for applying the ranked list of most relevant text-based terms to the multiple themes further includes:
instructions for selecting a second most relevant text-based term from the ranked list;
instructions for searching the listing of multiple themes to identify a corresponding theme in the listing that includes the second most relevant text-based term; and
instructions for assigning the corresponding theme that includes the second most relevant text-based term to be the second most relevant theme.

21. The computer readable medium as in claim 17 further comprising:
instructions for generating document metadata including the ranked themes;
instructions for associating the document metadata to the document; and
instructions for distributing the document metadata to at least one remote process that utilizes the ranked themes to identify relevant advertisements for displaying to a user upon retrieval of the document by the user.

22. The computer readable medium as in claim 21 further comprising:
instructions for utilizing the statistical analysis to produce a ranked list of most relevant text-based terms found in the document, the most relevant text-based terms representing an essence of the document; and
instructions for producing the document metadata to include permutations of top text-based terms in the ranked list of most relevant text-based terms.

23. The computer readable medium as in claim 17 further comprising:
instructions for utilizing the statistical information to identify a corresponding set of at least one most representative text-based term for each page of multiple pages in the document; and
instructions for utilizing the corresponding set of at least one most representative text-based terms to identify a theme associated with a respective page for each of the multiple pages.

24. The computer readable medium as in claim 23, wherein the instructions for utilizing the corresponding set of at least one most representative text-based term to identify the theme associated with the respective page includes:
instructions for identifying a most representative text-based term for the respective page;
instructions for searching the listing of multiple themes to identify a corresponding theme in the listing that includes the most representative text-based term for the respective page; and
instructions for assigning the corresponding theme in the listing that includes the most representative text-based term for the respective page to be the corresponding theme for the respective page.

25. A computer program product including a computer-readable medium having instructions stored thereon for processing data information, such that the instructions, when carried out by a processing device, enable the processing device to perform the operations of:
receiving a collection of text-based terms associated with a document;
performing a statistical analysis on the text-based terms to identify a distribution and relative frequency of the text-based terms in the document;
receiving a listing of multiple themes associated with the document, the listing of multiple themes being derived as a result of performing a semantic analysis of the document; and
utilizing the distribution and relative frequency information derived from the statistical analysis to rank the multiple themes.

26. A computer system comprising:
a processor;
a memory unit that stores instructions associated with an application executed by the processor; and an interconnect coupling the processor and the memory unit, enabling the computer system to execute the application and perform operations of:

receiving a collection of text-based terms associated with a document;

performing a statistical analysis on the text-based terms to identify a distribution and relative frequency of the text-based terms in the document;

receiving a listing of multiple themes associated with the document, the listing of multiple themes being derived as a result of performing a semantic analysis of the document; and utilizing the distribution and relative frequency information derived from the statistical analysis to rank the multiple themes.

* * * * *